Aug. 10, 1965  G. B. OTTINGE  3,199,188
METHOD OF MANUFACTURING COOKING VESSELS WITH
A HEAT DISTRIBUTION PLATE THEREON
Filed April 1, 1963  4 Sheets-Sheet 1

GUSTAV B. OTTINGE
INVENTOR
BY Wendenoth, Lind & Ponack
ATTORNEYS

Aug. 10, 1965  G. B. OTTINGE  3,199,188
METHOD OF MANUFACTURING COOKING VESSELS WITH
A HEAT DISTRIBUTION PLATE THEREON
Filed April 1, 1963  4 Sheets-Sheet 2

GUSTAV B. OTTINGE
INVENTOR
BY Wenderoth, Lind & Ponack
ATTORNEYS

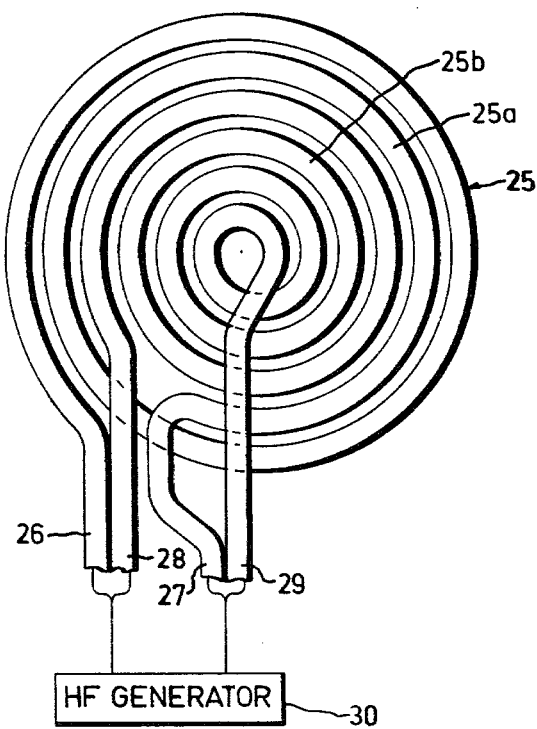

Aug. 10, 1965    G. B. OTTINGE    3,199,188
METHOD OF MANUFACTURING COOKING VESSELS WITH
A HEAT DISTRIBUTION PLATE THEREON
Filed April 1, 1963    4 Sheets-Sheet 4

GUSTAV B. OTTINGE
INVENTOR
BY Wenderoth, Lind & Ponack
ATTORNEYS

United States Patent Office 3,199,188
Patented Aug. 10, 1965

3,199,188
METHOD OF MANUFACTURING COOKING VESSELS WITH A HEAT DISTRIBUTION PLATE THEREON
Gustav Börje Ottinge, Ronneby, Sweden, assignor to Kockums Jernverks Aktiebolag, Malmo, Sweden, a corporation of Sweden
Filed Apr. 1, 1963, Ser. No. 269,419
Claims priority, application Sweden, Nov. 3, 1959, 10,256/59
6 Claims. (Cl. 29—475)

This is a continuation in part of the application Serial No. 65,793, filed October 28, 1960, now abandoned.

The present invention relates to improvements in stainless steel cooking vessels, and more particularly to a method of making a stainless steel cooking vessel having a heat distribution plate fused to the outside of its bottom, as well as to a stainless steel cooking vessel manufactured in accordance with this method.

At present, such cooking vessels are usually manufactured by brazing the heat distribution plate to the outside of a vessel formed in a drawing press and having the width of the finished cooking vessel, and pressing the heat distribution plate and the bottom against each other between pressing dies both of which may be plane or one convex and the other concave. According to another known method the heat distribution plate is brazed to a plane circular sheet blank, the plane blank provided with the plate then being drawn to the final form of the cooking vessel. A cooking vessel manufactured by one or other of such methods is thermally unstable in regard to the shape of its bottom, inasmuch as the bottom and the heat distribution plate brazed thereto tend to warp after they have been used for some time. A resulting slight concavity of the outside of the heat distribution plate is not detrimental to the heat distribution between the cooking vessel and a heating plate and may therefore be tolerated, provided it keeps within reasonable limits. An externally convex heat distribution plate, on the other hand, gives a very poor heat transfer because of the resulting point contact between the heat distribution plate and the electric heating plate of a kitchen range or the like. As the bottom and the heat distribution plate of conventional cooking vessels with brazed-on heat distribution plate may warp in either direction, it is most important, in view of the unfavourable conditions prevailing in externally convex heat distribution plates, to eliminate any tendency towards uncontrollable deformation of the vessel.

Faced with the problem of overcoming the above described disadvantages, I endeavoured to find the cause of this deformation and have established that this deformation is due to heavy stresses arising in a narrow area of the bottom of the cooking vessel at the periphery when the vessel is formed in the drawing press. Upon heating of the cooking vessel these stresses are released resulting in a deformation of the bottom and the heat distribution plate brazed thereto. However, such stresses are not released when the heat distribution plate is brazed on, because of the required compression of the bottom and the heat distribution plate between the pressing dies, and therefore they are not released until the cooking vessel is used, thus causing great inconvenience to the user.

In order to eliminate a disadvantageous deformation of the bottom due to the said stresses in the peripheral area of the bottom, the present invention proposes, in a method for manufacturing stainless steel cooking vessels having a heat distribution plate secured to the outside of the bottom of the vessel, the steps of providing an initial vessel having a width greater than that of the finished cooking vessel, placing a heat distribution plate over the outer surface of the bottom of said initial vessel, pressing said heat distribution plate against said bottom between plane press surfaces, forming a fused metal bond between the bottom and plate when these are pressed together, and transferring the material in a marginal area of the bottom to the wall of said initial vessel by plastic working operations to reduce the width of said initial vessel to the intended width of the finished cooking vessel. The heavy stresses which may arise during the forming of the wider vessel in the peripheral area of the bottom will then be displaced in an upward direction into the side wall of the vessel where, I have found, they cannot be detrimental to the thermal stability of the bottom, without at the same time being replaced by new stresses in the peripheral area of the bottom of the narrower vessel, since the plastic working serves to produce a slight deformation and therefore can be effected with a small amount of force which does not result in any stresses in the bottom that are harmful to the thermal stability of the bottom.

It has been proposed in the manufacture of a cooking vessel having a heat distribution plate on the outside of the bottom to provide by a drawing operation an initial vessel having a width greater than that of the finished cooking vessel and having a depression in the outside of the bottom, and to cast a heat distribution metal in said depression in order to form of said metal a plate adhered to the bottom of the vessel. Then, the initial vessel provided with the heat distribution plate thus formed is redrawn to reduce its width to the intended width of the final cooking vessel. However, over such casting the method according to the invention involves the essential advantages of providing a more exact control of the thickness of the heat distribution plate, providing a better planeness of the heat distribution plate, and reducing the temperature necessary to bond the heat distribution metal to the bottom of the initial vessel as a fused metal bond may be achieved by using a solder having a low melting point e.g. 1200° F., whereas melting or casting a heat distribution plate of copper or brass must take place at 2000 and 1650° F., respectively; casting of light alloy having a low melting point will be totally out of question due to the unfavourable bond obtained.

In the following more detailed description of the invention, reference will be had to the accompanying drawings in which:

FIG. 3 is a plan view of an inductor coil provided in an upper pressure die of the apparatus shown in FIG. 2;

Figure 1:
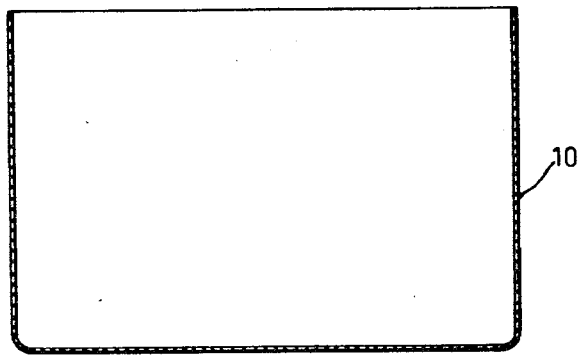
FIG. 1 is an axial section of the initial vessel used as a starting material for the method according to the invention.

In practicing the method according to the invention for manufacturing a cylindrical cooking vessel of stainless sheet steel, e.g., of the 18–8 type I proceed from a cylindrical vessel of a diameter larger than that intended for the finished cooking vessel. The difference in diameter may amount to 10 or 15% of the diameter of the finished cooking vessel. This initial vessel is shown in FIG. 1 of the drawings where it is designated 10. It can be manufactured in the conventional manner by forming a circular blank in a drawing press. A heat distribution plate of copper, brass, tombac or some other metal or metal alloy with good heat conductive properties is brazed to the outside of the bottom of the vessel 10 by using the apparatus shown in FIG. 2.

Figure 2:
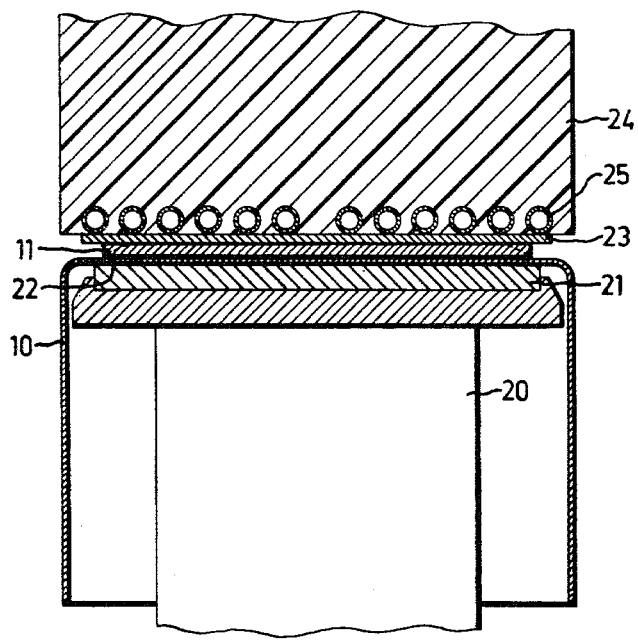
FIG. 2 is an axial section of the vessel and an apparatus used for brazing a heat distribution plate to the outside of the bottom of said vessel.

The initial vessel 10 is placed in an inverted position over a support or reciprocable lower die 20 having an asbestos cement sheet 21 (thickness about ½") forming a plane surface engaging the inner surface of the bottom of vessel 10. Before a heat distribution plate 11 is placed on the outside of the bottom of vessel 10, said plate is coated on the side thereof adapted to be bonded to the vessel, with a liquid solution or dispersion of a suitable flux. Then, a pulverized brazing mixture having its melting point at about 1200° F. (a brazing mixture containing 45% silver and 30% copper, the balance including zinc and cadmium, has been found suitable for brazing a copper plate to an 18–8 stainless steel vessel) is sprinkled over the flux coating when still wet, and is uniformly distributed over the plate by vibrating said plate. With the brazing mixture adhered to plate 11 by the flux coating, said plate is placed on the outer side of the bottom of initial vessel 10 with the coated side of the plate turned against the bottom as shown in FIG. 2 where the coating is indicated at 22. Over the heat distribution plate 11 there is placed an asbestos sheet 23 (thickness about ⅛"). Plate 11 is pressed against the bottom of vessel 10 between support 20 and an upper reciprocable die 24 consisting of a thermally and electrically insulating material, e.g., synthetic resin such as epoxy resin, said die having a plane end surface and including in said surface an inductor coil 25 of copper tubing let into the insulating material.

The details of coil 25 are shown in FIG. 3. As disclosed therein said coil consists of two separate coil sections 25a and 25b, respectively, both in the form of a plane helix and having outer and inner terminal ends 26 and 27, respectively, of section 25a, 28 and 29, respectively, of section 25b. Terminal ends 26 and 28 are connected to one terminal of a high frequency generator 30, terminal ends 27 and 29 being connected to the other terminal of generator 30. Thus, sections 25a and 25b are connected in parallel to generator 30. The outermost winding of the outer coil section 25a preferably has an outer diameter as large as to be disposed just outside the heat distribution plate 11 to be brazed to vessel 10. A cooling liquid may be circulated through the tubing forming coil 25.

Between opposite sides of the sandwich structure formed by the bottom of vessel 10, the heat distribution plate 11 and the brazing mixture 22 therebetween is applied a pressure of about 5500 lbs. for a heat distribution plate diameter of 5½"–8" between the plane surfaces of support 20 and die 24. The sandwich structure is heated between heat insulating sheets 21 and 23 by feeding an A.C. current through coil 25 from the high frequency generator 30 to inductively heat the sandwich structure in order to fuse the brazing mixture and produce a fused metal bond between the bottom and the plate. As an example only, the generator supplies 30 kw. to coil 25 at 3000 c./s. Induction heating affords the advantage that the heating may be instantaneous and may be limited to the bottom of vessel 10 and to the heat distribution plate 11 with the brazing mixture therebetween, and the further advantage that a detrimental change in the grain structure of the stainless steel is avoided. When using the special inductor coil here described the sandwich structure will be heated to a higher temperature locally at the central area thereof. In contrast hereto inductor coils usually provided give a local higher temperature at the marginal portion of the sandwich structure. By using the coil just described the brazing mixture is uniformly fused throughout the area of the sandwich structure.

Moreover, heating of the bottom of vessel 10 to a higher temperature in a local central area thereof when pressing the bottom between plane surfaces provides a compression of said central area on account of the greater thermal expansion owing to the raised temperature, such compression of the material being accompanied by a stretch during cooling of the material, promoting the object of the invention to provide a plane, thermally stable bottom in a stainless steel cooking vessel having a heat distributing plate. When leaving the brazing process the initial vessel 10 is provided with the heat distribution plate 11 fused to the outside of the bottom thereof as shown in FIG. 4 in the drawings.

Preferably the heat distribution plate 11 should extend only across the plane portion of the bottom of the vessel 10, i.e., it should terminate at the rounded area where the bottom merges in the side wall of the vessel, as otherwise there is the risk of additional stresses being introduced into the bottom of the cooking vessel during the brazing.

Figure 4:
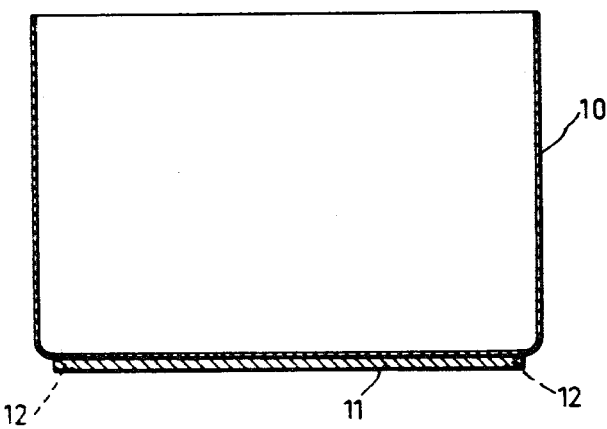
FIG. 4 is an axial section of the vessel shown in FIG. 1 with the heat distribution plate brazed thereto.
Figure 7:
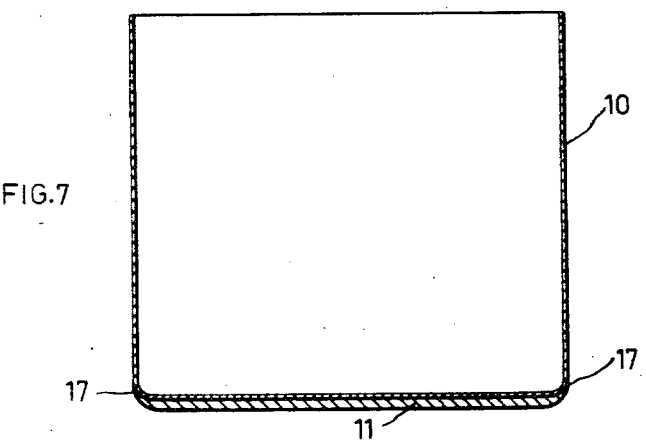
FIG. 7 is an axial section of the finished cooking vessel manufactured in accordance with the method shown in FIGS. 1–5.
Figure 5:
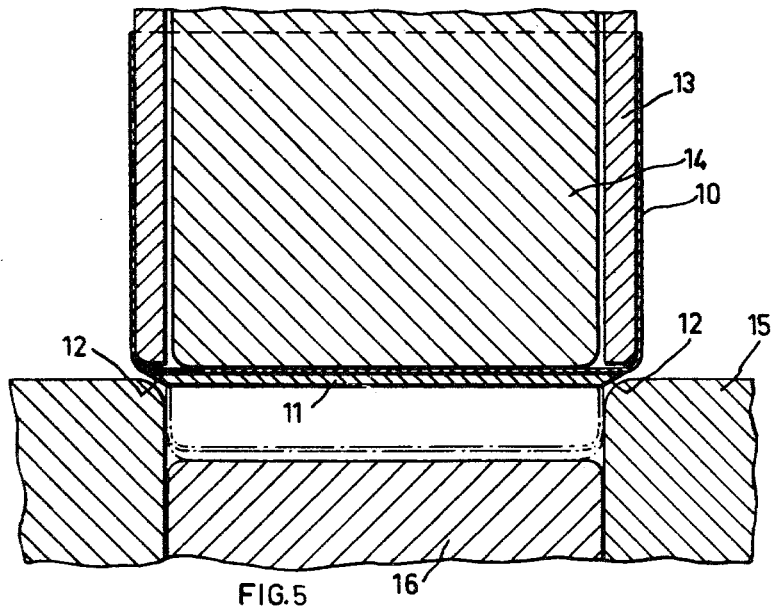
FIGS. 5 and 6 are diagrammatic axial sections of a drawing press in which the vessel with the heat distribution plate has been inserted, and show two alternatives of a drawing operation for reducing the width of the initial vessel.

For the continued working of the vessel as shown in FIG. 4 there are two alternatives. One of these alternatives, which also is the most advantageous, consists in bevelling the heat distribution plate 11 to approximately 20° relative to the bottom surface of the vessel along its periphery, as is shown by dotted lines in FIG. 4 at 12. Next, the width of the initial vessel is reduced to that intended for the finished vessel by transferring, in a plastic operation which according to FIG. 5 is performed in a drawing press, an annular portion of the bottom and the heat distribution plate, respectively, adjacent their respective peripheries to the side wall of the vessel. As will be seen from this figure, the vessel 10 is then held by a holder 13 and drawn by a punch 14 into a die 15 having a movable backing member 16 which is pressed against the outside of the heat distribution plate 11 with a certain force so as to prevent the bottom and the heat distribution plate brazed thereto from curving outwards during the drawing operation. Such curving would occur if no backing member were provided for the operation. Although the curving could be avoided by pushing the punch 14 all the way down in the die 15, such procedure would give rise to harmful stresses in the bottom of the vessel. After the drawing operation as shown in FIG. 5, the vessel 10 has the form illustrated in FIG. 7. As can be seen, the heat distribution plate 11 extends over the entire width of the bottom and snugly adheres to the outside of the vessel wall at 17.

Figure 6:
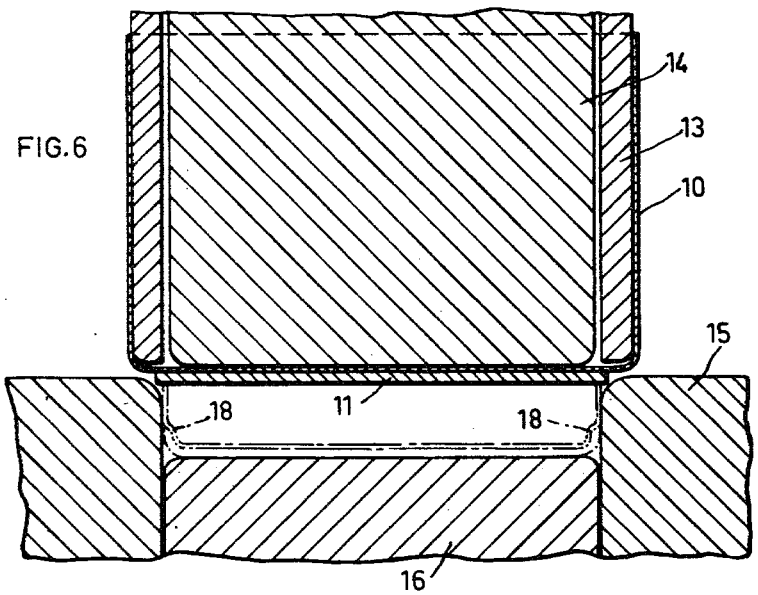

In the other alternative of the method according to the invention, I do not effect the earlier mentioned bevelling of the heat distribution plate at 12, but work the vessel instead in the drawing press as it is in FIG. 4. This is shown in FIG. 6 of the drawings. It is true that one stage of operation—the bevelling of the heat distribution plate—is eliminated by proceeding in this manner, but it cannot be avoided that the heat distribution plate produces a bead on the inside of the vessel, as is indicated at 18 in FIG. 6. Moreover, it is necessary to work the marginal portion of the heat distribution plate 11 on the outside of the vessel with a metal-cutting tool in order to produce a smooth transition between the heat distribution plate and the outside of the vessel wall. These disadvantages need not be taken into account, if the first alternative is chosen, where the drawing operation is effected more easily than in the other alternative, the metal-cutting operation is entirely unnecessary, and the finished vessel has a more attractive appearance.

The cooking vessel manufactured in accordance with the invention generally has a slight concavity on the outside of the heat distribution plate. This slight concavity is caused by bimetallic action during the brazing of the heat distribution plate and usually is of the order of 8 to 12 mils. This concavity can be tolerated and is even to be preferred, since the heat transfer at such small concavities is very satisfactory and there is no risk of a point contact between the outside of the bottom of the cooking vessel and an electric heating plate on a kitchen range or the like. However, if desired, the outside of the heat distribution plate can be planished in the usual manner or surfaced with a certain concavity in a templet. Alternatively, the bottom which is slightly convex on its inside because of the bimetallic action, can be sucked by vacuum with its inside into engagement with a plane or convex cartridge (vacuum chuck) whereupon the heat distribution plate is planished on its outside at right angles to the axis of the vessel. After the cooking vessel has been removed from the vacuum chuck, the bottom and the heat distribution plate brazed thereto spring back so that the external surface of the heat distribution plate will be slightly concave in the case of a plane cartridge or plane in the case of a convex cartridge. As a rule, however, such metal-cutting work can be completely dispensed with.

Finally, it is pointed out that the reduction of the width of the vessel provided with the heat distribution plate can also be effected by compression in a pressure lathe, instead of by the drawing press operation described in the above embodiment of the invention.

Summarizing, the method of the present invention has the following advantages:

(1) Bonding of the heat distribution plate can be effected at a comparatively low temperature.
(2) Heat need be supplied only to the part covered by the heat distribution plate.
(3) Inductive heating can be used, whereby the brazing time can be kept extremely short.
(4) The thickness of the heat distribution plate can be carefully controlled.
(5) The planeness of the heat distribution plate is very high after application.
(6) Relatively simple and extremely easily controlled steps are comprised in the method which gives a high production for a small investment.

What I claim and desire to secure by Letters Patent is:

1. In a method for manufacturing stainless steel cooking vessels having a heat distribution plate secured to the outside of the bottom of the vessel, the steps of providing an initial vessel having a width greater than that of the finished cooking vessel, placing a heat distribution plate over the outer surface of the bottom of said initial vessel with a brazing material disposed between the bottom and plate to form of said plate, bottom and brazing material a sandwich structure, pressing said heat distribution plate against said bottom between plane press surfaces, induction heating said sandwich structure when this is pressed together, to fuse said brazing material and thereby form a fused metal bond between the bottom and plate, the central area of said sandwich structure being heated with greater intensity than the marginal area thereof, and transferring the material in a marginal area of the bottom to the wall of said initial vessel by plastic working operations to reduce the width of said initial vessel to the intended width of the finished cooking vessel.

2. In a method for manufacturing stainless steel cooking vessels having a heat distribution plate secured to the outside of the bottom of the vessel, the steps of providing an initial vessel having a width greater than that of the finished cooking vessel, placing a heat distribution plate over the outer surface of the bottom of said initial vessel with a brazing material disposed between the bottom and plate to form of said plate, bottom and brazing material a sandwich structure, pressing said heat distribution plate against said bottom between heat insulating plane press surfaces, induction heating said sandwich structure when this is pressed together, to fuse said brazing material and thereby form a fused metal bond between the bottom and plate, the central area of said sandwich structure being heated with greater intensity than the marginal area thereof, and transferring the material in a marginal area of the bottom to the wall of said initial vessel by plastic working operations to reduce the width of said initial vessel to the intended width of the finished cooking vessel.

3. In a method for manufacturing stainless steel cooking vessels having a heat distribution plate secured to the outside of the bottom of the vessel, the steps of providing an initial vessel having a width greater than that of the finished cooking vessel, placing a heat distribution plate over the outer surface of the bottom of said initial vessel with a brazing material disposed between the bottom and plate to form of said plate, bottom and brazing material a sandwich structure, pressing said heat distribution plate against said bottom between plane press surfaces, induction heating said sandwich structure when this is pressed together, to fuse said brazing material and thereby form a fused metal bond between the bottom and plate, the central area of said sandwich structure being heated with greater intensity than in the marginal area thereof, and transferring the material in a marginal area of the bottom and of the heat distribution plate bonded thereto to the wall of said initial vessel by working said initial vessel with said heat distribution plate bonded thereto in a drawing press to reduce the width of said initial vessel to the intended width of the finished cooking vessel.

4. In a method for manufacturing stainless steel cooking vessels having a heat distribution plate secured to the outside of the bottom of the vessel, the steps of providing an initial vessel having a width greater than that of the finished cooking vessel, placing a heat distribution plate over the outer surface of the bottom of said initial vessel with a brazing material disposed between the bottom and plate to form of said plate, bottom and brazing material a sandwich structure, pressing said heat distribution plate against said bottom between heat insulating plane press surfaces, induction heating said sandwich structure when this is pressed together, to fuse said brazing material and thereby form a fused metal bond between the bottom and plate, the central area of said sandwich structure being heated with greater intensity than the marginal area thereof, and transferring the material in a marginal area of the bottom and of the heat distribution plate bonded thereto to the wall of said initial vessel by working said initial vessel with said heat distribution plate bonded thereto in a drawing press to reduce the width of said initial vessel to the intended width of the finished cooking vessel.

5. In a method for manufacturing stainless steel cooking vessels having a heat distribution plate secured to the outside of the bottom of the vessel, the steps of providing an initial vessel having a width greater than that of the finished cooking vessel, placing a heat distribution plate over the outer surface of the bottom of said initial vessel with a brazing material disposed between the bottom and plate to form of said plate, bottom and brazing material a sandwich structure, said plate having the peripheral margin bevelled on the side of the plate facing from the bottom of said initial vessel, pressing said heat distribution plate against said bottom between heat insulating plane press surfaces, induction heating said sandwich structure when this is pressed together, to fuse said brazing material and thereby form a fused metal bond between the bottom and plate, the central area of said sandwich structure being heated with greater intensity than the marginal area thereof, and transferring the material in a marginal area of the bottom and of the heat distribution plate bonded thereto to the wall of said initial vessel by working said initial vessel with said heat distribution plate bonded thereto in a drawing press to reduce the width of said initial vessel to the intended width of the finished cooking vessel, said vessel being backed off by a backing member on the outside of the heat distribution plate during said drawing operation.

6. In a method for manufacturing stainless steel cooking vessels having a heat distribution plate secured to the outside of the bottom of the vessel, the steps of providing an initial vessel having a width greater than that of the finished cooking vessel, placing a heat distribution plate over the outer surface of the bottom of said initial vessel with a brazing material disposed between the bottom and plate to form of said plate, bottom and brazing material a sandwich structure, said plate having the peripheral margin bevelled on the side of the plate facing from the bottom of said initial vessel, pressing said heat distribution plate against said bottom between plane press surfaces, induction heating said sandwich structure when this is pressed together, to fuse said brazing material and thereby form a fused metal bond between the bottom and plate, the central area of said sandwich structure being heated with greater intensity than the marginal area thereof, and transferring the material in a marginal area of the bottom and of the heat distribution plate bonded thereto to the wall of said initial vessel by working said initial vessel with said heat distribution plate bonded thereto in a drawing press to reduce the width of said initial vessel to the intended width of the finished cooking vessel.

References Cited by the Examiner

UNITED STATES PATENTS

| | | | |
|---|---|---|---|
| 2,517,584 | 8/50 | Mapes et al. | 29—528 |
| 3,041,718 | 7/62 | Stuchberry | 29—480 |

FOREIGN PATENTS 603,522  6/48  Great Britain.

JOHN F. CAMPBELL, *Primary Examiner.*